United States Patent [19]

Verney et al.

[11] Patent Number: 5,422,517
[45] Date of Patent: Jun. 6, 1995

[54] CONTROL OF ELECTRIC LOADS DURING GENERATOR FAILURE IN A MULTI-GENERATOR SYSTEM

[75] Inventors: Jay F. Verney, Madison; Gerald W. Parkinson, Shelton, both of Conn.

[73] Assignee: United Technologies Corporation, Hartford, Conn.

[21] Appl. No.: 67,751

[22] Filed: May 26, 1993

[51] Int. Cl.6 .............................................. H02H 7/00
[52] U.S. Cl. ........................................ 307/29; 307/39
[58] Field of Search ................... 307/64, 66, 84–85, 307/86, 118, 117, 38, 39, 29; 361/20, 25; 322/28, 33

[56] References Cited

U.S. PATENT DOCUMENTS

| | | | |
|---|---|---|---|
| 3,505,531 | 4/1970 | Wattson | 307/64 |
| 3,509,357 | 4/1970 | Studtmann | 307/64 |
| 3,704,380 | 11/1972 | Cohn | 307/52 |
| 3,723,750 | 3/1973 | Dixon et al. | 307/64 |
| 3,842,249 | 10/1974 | Geyer et al. | 235/151.21 |
| 4,064,485 | 12/1977 | Leyde | 340/147 |
| 4,096,394 | 6/1978 | Ullmann et al. | 307/46 |
| 4,136,286 | 1/1979 | O'Halloran et al. | 307/57 |
| 4,216,384 | 8/1980 | Hurley | 307/39 |
| 4,380,725 | 4/1983 | Sherman | 320/35 |
| 4,482,857 | 11/1984 | Porche et al. | 323/205 |
| 4,488,198 | 12/1984 | Christen et al. | 361/20 |
| 4,528,459 | 7/1985 | Wiegel | 307/66 |
| 4,551,632 | 11/1985 | Jourdan et al. | 307/9 |
| 4,560,887 | 12/1985 | Schneider | 307/66 |
| 4,604,565 | 8/1986 | Yokota et al. | 320/15 |
| 4,937,514 | 6/1990 | Iwatani | 322/33 |
| 4,967,096 | 10/1990 | Diemer et al. | 307/19 |

*Primary Examiner*—Brian K. Young
*Assistant Examiner*—Jonathan S. Kaplan
*Attorney, Agent, or Firm*—Michael Grillo

[57] ABSTRACT

In response to the loss of a generator in an electrical power system, all operating electrical loads are automatically switched to a second generator, and the electric power system continues to provide power to all of the loads. The total power required to operate all operating loads is permitted to exceed the nominal rated capacity of the operating generator, and the winding temperature or other critical hotspot temperature of the operating generator is monitored to determine whether thermal stress limits will be exceeded. If the critical hotspot temperature approaches the thermal stress limit, certain electrical loads are disconnected via a pre-programmed load shed priority schedule, and thereafter loads are re-connected as other loads are de-energized or if the critical hotspot temperature decreases.

22 Claims, 1 Drawing Sheet

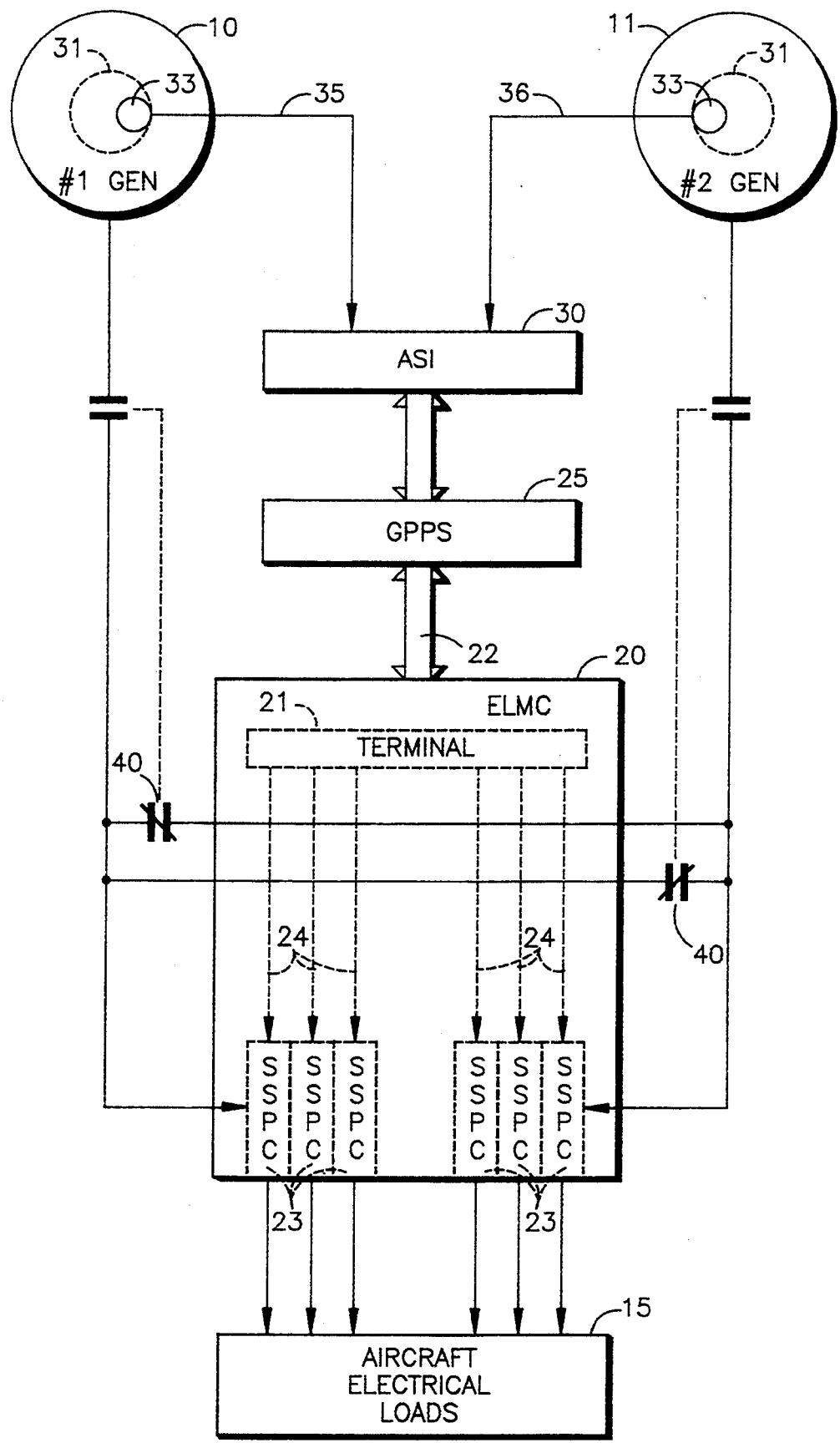

CONTROL OF ELECTRIC LOADS DURING GENERATOR FAILURE IN A MULTI-GENERATOR SYSTEM

TECHNICAL FIELD

The present invention relates to electrical load systems, and more particularly to control of electric loads during a generator failure in a multi-generator system.

BACKGROUND OF THE INVENTION

Many electric power systems include two or more generators for redundancy and safety. For example, helicopter electric power systems are typically designed so that loss of one generator will not jeopardize mission completion, e.g., essential mission equipment will not be de-energized. In one example of a helicopter electric power system, a pair of generators are provided to power various helicopter loads. A #1 generator has associated with it a #1 primary bus and a #1 monitor bus. Similarly, a #2 generator is provided to power a #2 primary bus and a #2 monitor bus. Each bus is rated at 15 KVA, and each generator is rated at 45 KVA. The primary buses are typically used to power essential mission equipment, and the monitor buses provide power to auxiliary and peripheral equipment. In the event that one of the generators fails, for example the #1 generator fails, then the #1 monitor bus is automatically de-energized, and the #2 primary bus, #2 monitor bus and the #1 primary bus are powered from the #2 generator.

The above described helicopter electric power system architecture is based upon the assumption that each of the generators is of a fixed capacity, and that all electric loads are energized. It also assumes that generator capacity cannot be monitored and that the total power consumption of individual loads cannot be monitored. Therefore, the generators are sized to provide power under worst-case conditions. Additionally, certain loads powered by a corresponding monitor bus may be unnecessarily de-energized upon loss of a primary generator.

DISCLOSURE OF INVENTION

Objects of the invention include provision of an electric power system which, upon failure of a generator in a multi-generator system, sheds loads based on the power available from the remaining generators and the criticality of operating loads.

A further object of the present invention is to provide an aircraft electric power system which determines the power available from a generator based on actual generator parameters.

According to the present invention, in response to the loss of a generator in an electrical power system, all operating electrical loads are automatically switched to a second generator, and the electric power system continues to provide power to all of the loads, the total power required to operate all operating loads is permitted to exceed the nominal rated capacity of the operating generator, and the winding temperature or other critical hotspot temperature of the operating generator is monitored to determine whether thermal stress limits will be exceeded. If the critical hotspot temperature approaches the thermal stress limit, certain electrical loads are disconnected via a pre-programmed load shed priority schedule, and thereafter loads are re-connected as other loads are de-energized or if the critical hotspot temperature decreases.

The present invention provides a significant improvement over the prior art because generators can be loaded to the maximum safe capacity for their operating conditions. Additionally, in an electrical power system used in an environment having critical loads, such as in an aircraft electrical power system, the continued operation of aircraft loads may allow the pilot to complete the mission while operating with a loss of a generator. The generators are not operated according to fixed capacity limits, but instead the capacity of a generator is determined with respect to specific operating parameters of the generator, such as the winding temperature of the generator or other generator critical hotspot temperature.

In response to the loss of a generator in a system having more than one generator, loads are not automatically de-energized, but rather are only de-energized in response to the critical hotspot temperature in an operating generator approaching a thermal stress limit. Additionally, loads are de-energized according to a specific protocol to ensure that mission essential loads remain energized.

The foregoing and other objects, features and advantages of the present invention will become more apparent in light of the following detailed description of exemplary embodiments thereof, as illustrated in the accompanying drawing.

BRIEF DESCRIPTION OF THE DRAWINGS

The figure is a schematic block diagram of the electrical load system of the present invention.

BEST MODE FOR CARRYING OUT THE INVENTION

The electric load system of the present invention is particularly well suited for providing control of electrical loads during failure of one or more system generators. In response to a generator failure, all loads remain energized by operating generators unless the temperature of a winding or other critical hotspot of an operating generator approaches a thermal stress limit, wherein loads are shed in accordance with a pre-programmed load priority schedule. Loads may be re-energized as other loads are de-energized or if the critical hotspot temperature decreases.

Referring to the figure, a pair of electrical generators 10,11 provide power to aircraft electrical loads 15 via electrical load management centers (ELMC) 20. Each ELMC contains a remote terminal section 21 and a set of solid state power controllers (SSPC) 23. Each of the aircraft loads 15 has associated therewith an SSPC which is controlled by an ELMC. The ELMC receives input power from the generators 10,11 and digital commands on a data bus 22. The ELMC terminal section 21 translates the digital commands from the data bus 22 into discretes on the lines 24 that turn on or off, or reset, the SSPCs. The amount of electrical load demand on the generators 10,11 is determined by the particular loads connected, in conjunction with the corresponding rated power usage of each load. A general purpose processor set (GPPS) 25 contains one or more computers or microprocessors which are responsive to pilot generated commands, aircraft sensors and stored subroutines to instruct the ELMCs, via the data bus 22, to turn on or off individual loads 15. The GPPS 25 also monitors various generator parameters via an aircraft sensor interface (ASI) 30.

The output power capability of electrical generators is limited by the internal build-up of heat from friction, hysteresis and eddy current losses in the magnetic materials, and losses due to voltage drops in windings or components. The various parts each have a temperature limit that must not be exceeded if early failure of the generator is to be avoided. The internal component whose temperature first reaches its limit in response to increasing load is referred to as the critical hotspot 31, and its location is determined by analysis during design of the generator and confirmed during a test program. Ideally, in accordance with the present invention, the temperature of the critical hotspot 31 is monitored by placing a heat sensor 33, e.g., thermistor, thermocouple, resistance temperature detector (RTD), etc., at the critical hotspot 31 location. If it is not practical to place the sensor 33 in the critical hotspot 31 location, it may be placed in another location whose temperature can be demonstrated to have a fixed relation to the critical hotspot 31 temperature. Historically, the main stator windings were the critical hotspot 31 because they carry the highest currents, and the cooling medium did not have intimate contact with the windings themselves. In some recent designs, however, the rotating rectifiers are the first components to reach their temperature limits.

The critical hotspot 31 temperature readings are provided on the lines 35, 36 from the first and second generators 10, 11, respectively, to the GPPS 25 via the ASI 30. The GPPS compares the temperature readings provided by the ASI to the thermal stress limits of the critical hotspot 31 to ensure that the component is not operated above corresponding thermal stress limits.

If, for example, the stator winding is the critical hotspot 31 and the thermal stress limit of the winding insulation is exceeded, the insulation may begin to deteriorate. Repeated and/or prolonged occurrences of high temperature conditions within the windings would, if permitted, eventually cause the insulation to fail, resulting in a short circuit in the windings, thereby burning up the generator. The prior method of determining generator capacity was a function of environmental conditions, primarily the oil temperature (for oil sprayed cooled generators), and oil rate of flow. Because the environment is unpredictable and difficult to monitor under the prior methods of power distribution, the generators were sized for the worst case temperature conditions and the sum total of all the mission and flight critical electrical loads that might be in use. Using the temperature sensors of the present invention in conjunction with the GPPS, the critical temperature is directly measured to ensure that thermal stress limits are not exceeded.

Upon loss of a generator the electrical loads are automatically switched to a second generator by the ELMC. Therefore, there is not an immediate loss of loads as there is with the monitor bus approach. The electrical power system continues to provide power to all of the operating loads and will appear normal from the pilots point of view. As the amount of electrical load demand increases, which is a function of aircraft operational demand, the total power required may exceed the nominal rated capacity of the operating generator. This is possible because a generator can produce more power than its nominal rating under most operational conditions. The nominal installed capacity of a generator is the minimum power in KVA or amps that the generator is guaranteed to deliver under worst case conditions of ambient temperature, drive speed, coolant temperature, coolant flow rate, coolant internal distribution, internal tolerances such as winding resistances and air gaps, and power factor (for AC generators). It is unlikely that all these factors will ever actually combine to produce the worst case conditions, so that generators in service can normally provide power in excess of nominal capacity. The present invention allows the safe use of this excess power to complete a mission or assist in return to base after a generator failure or component damage.

During single generator operation, the critical hotspot temperature, e.g., winding temperature, of the operating generator is continuously monitored, and if the winding temperature begins to approach the thermal stress limit, certain electrical loads are disconnected via a preprogrammed load shed priority as determined through GPPS commands to the corresponding ELMC. The sheading of loads in accordance with a pre-programmed priority is well known in the art as shown for example in U.S. Pat. No. 3,704,380 to Cohn and U.S. Pat. No. 3,842,249 to Geyer et at. Additional loads will be shed only if the winding temperature continues to approach the thermal stress limit. The GPPS is programmed to shed auxiliary and non-mission critical loads which will not affect the safety of the aircraft. These loads can be re-connected as other loads are de-energized through aircraft operational demand, or if the generator winding temperature decreases.

The invention has been described thus far as shedding loads in response to a critical hotspot temperature exceeding a corresponding thermal stress limit. A temperature sensor placed in the critical hotspot provides an indication of the critical hotspot temperature to the GPPS 25 via the ASI 30. The GPPS compares the temperature to the thermal stress limit to determine if loads should be shed. In an alternative embodiment of the present invention, the GPPS determines the rate of change of critical hotspot temperature. This may be accomplished, for example, by differentiating the temperature signal provided by a temperature sensor via the ASI. If the critical hotspot temperature is increasing at a rate greater than a threshold rate or maximum allowable rate, then loads are shed to thereby prevent the critical hotspot temperature from exceeding the corresponding thermal stress limit. This method of controlling generator load during a generator failure in a multi-generator system provides the significant advantage of anticipating when a generator will be overloaded based on the rate of change of critical hotspot temperature, and shedding loads before the critical hotspot temperature actually exceeds the corresponding thermal stress limit.

In a second alternative embodiment of the present invention, the GPPS is responsive to either the critical hotspot temperature exceeding the corresponding thermal stress limit, or the rate of increase of critical hotspot temperature exceeding a maximum allowable rate for shedding loads. Therefore, if critical hotspot temperature is increasing at a rate below the maximum allowable rate, loads are shed once the critical hotspot temperature exceeds the corresponding thermal stress limit.

The present invention is equally applicable to both AC and DC electrical load systems, what is important is that a temperature sensor is placed in the critical hotspot location, or another location whose temperature bears a fixed relationship to the critical hotspot temperature. Although the invention is described as shedding loads in response to a critical hotspot temperature exceeding a thermal stress limit, load shedding may actually commence when the critical hotspot temperature exceeds a trip temperature which is below the thermal stress limit by a threshold value to thereby provide a safety margin.

Although the invention is described as automatically transferring all operating loads to operating generators in response to a generator failure, certain loads may be shed if the total load will clearly overload the operating generators. As described herein above, generators are provided with a nominal rated capacity which may be exceeded in accordance with the present invention provided that the critical hotspot temperature does not exceed a thermal stress limit or the rate of increase of critical hotspot temperature does not exceed a maximum allowable rate. Under certain circumstances, when the load far exceeds the generator nominal rated capacity, it is clear that thermal stress limits will be exceeded. Under these circumstances, certain loads are shed rather than being transferred to an operating generator. The GPPS determines the total load based on the particular loads connected, in conjunction with the corresponding rated power usage of each connected load. If the total load exceeds a maximum allowable load, then loads are shed. The maximum allowable load is greater than the nominal rated capacity, and is the amount of load where it is clear that thermal stress limits will be exceeded.

Loads may be automatically re-energized in accordance with the present invention when the critical hotspot temperature falls below a reset temperature which bears a fixed relationship to the thermal stress limit. Alternatively, loads may be permissively re-energized in response to pilot commands when the critical hotspot temperature falls below the reset temperature. Ideally, the reset temperature is sufficiently below the trip temperature to prevent a load from cycling on and off. Whenever a load is shed, it may always be re-energized in response to pilot commands. If the re-energization of a shed load will overload the operating generators, then a load of the next lowest priority is automatically shed. This allows the pilot to override the decision of the shed routine as to which loads should be de-energized during a generator overload.

Although the invention has been described and illustrated with respect to exemplary embodiments thereof, it should be understood by those skilled in the art that the foregoing and various other changes, omissions and additions may be made therein and thereto, without departing from the spirit and scope of the present invention.

We claim:

1. An electrical power system for controlling electrical loads during a generator failure in a multi-generator system, comprising:
    temperature sensing means for providing temperature signals each indicative of the temperature of a generator critical hotspot for a corresponding operating generator,
    said generator critical hotspot being indicative of the generator internal component whose temperature first reaches its thermal limit in response to increasing generator load; and
    processing means responsive to one of said temperature signals being in excess of a corresponding temperature limit for shedding electrical loads.

2. An electrical power system according to claim 1 further comprising:
    means responsive to said temperature signals for providing rate signals indicative of the rate of increase of said temperature signals; and
    said processing means being responsive to one of said rate signals being in excess of a maximum allowable rate for shedding electrical loads.

3. An electrical power system according to claim 2 further comprising:
    means for providing a generator trip signal in response to a generator failure; and
    said processing means being responsive to said generator trip signal for powering all operating electrical loads from operating generators.

4. An electrical power system according to claim 1 wherein said processing means is responsive to said temperature signal being below a reset signal for automatically re-energizing shed loads.

5. An electrical power system according to claim 2 wherein said processing means is responsive to said temperature signal being below a reset signal for automatically re-energizing shed loads.

6. An electrical power system according to claim 2 wherein said temperature sensing means are located at said generator critical hotspot.

7. An electrical power system according to claim 2 wherein said temperature sensing means are located at a position within each generator whose temperature bears a fixed relationship to the temperature of said critical hotspot.

8. An electrical power system according to claim 4 wherein said temperature limit and said reset signal are directly related to said critical hotspot thermal limit.

9. An electrical power system according to claim 5 wherein said temperature limit and said reset signal are directly related to said critical hotspot thermal limit.

10. An electrical power system comprising:
    at least two generators;
    means for providing a generator trip signal in response to a generator failure;
    temperature sensing means for providing temperature signals each indicative of the temperature of a generator critical hotspot for a corresponding operating generator,
    said generator critical hotspot being indicative of the generator internal component whose temperature first reaches its thermal limit in response to increasing generator load;
    means responsive to said temperature signals for providing rate signals indicative of the rate of increase of said temperature signals; and
    processing means responsive to said generator trip signal for powering all operating electrical loads from operating generators and responsive to one of said rate signals being in excess of a maximum allowable rate for shedding electrical loads.

11. An electrical power system according to claim 10 wherein said processing means is further responsive to one of said temperature signals being in excess of a corresponding temperature limit for shedding electrical loads.

12. An electrical power system according to claim 11 wherein said processing means is responsive to said temperature signal being below a reset signal for automatically re-energizing shed loads.

13. An electrical power system according to claim 11 wherein said temperature sensing means are located at said generator critical hotspot.

14. An electrical power system according to claim 11 wherein said temperature sensing means are located at a position within each generator whose temperature bears a fixed relationship to the temperature of said critical hotspot.

15. An electrical power system according to claim 12 wherein said temperature limit and said reset signal are directly related to said critical hotspot thermal limit.

16. A method for controlling electrical loads during a generator failure in a multi-generator system, comprising the steps of:
providing a generator trip signal in response to a generator failure;
providing temperature signals each indicative of the temperature of a generator critical hotspot for a corresponding operating generator,
said generator critical hotspot being indicative of the generator internal component whose temperature first reaches its thermal limit in response to increasing generator load;
powering all operating electrical loads from operating generators in response to said generator trip signal; and
shedding electrical loads in response to one of said temperature signals being in excess of a corresponding temperature limit.

17. The method of claim 16 further comprising the steps of:
providing rate signals indicative of the rate of increase of said temperature signals; and
shedding electrical loads in response to one of said rate signals being in excess of a maximum allowable rate.

18. The method of claim 17 further comprising the step of automatically re-energizing shed loads in response to said temperature signal being below a reset signal.

19. The method of claim 17 wherein said temperature signals are provided by temperature sensing means.

20. The method of claim 19 further comprising the step of locating said temperature sensing means at said generator critical hotspot.

21. The method of claim 19 further comprising the step of locating said temperature sensing means at a position within each generator whose temperature bears a fixed relationship to the temperature of said critical hotspot.

22. The method of claim 18 wherein said temperature limit and said reset signal are directly related to said critical hotspot thermal limit.

* * * * *